US012496020B2

(12) United States Patent
Bal et al.

(10) Patent No.: US 12,496,020 B2
(45) Date of Patent: Dec. 16, 2025

(54) HIGH SENSITIVITY CONTINUOUS BED MOTION

(71) Applicant: Siemens Medical Solutions USA, Inc., Malvern, PA (US)

(72) Inventors: Girish Bal, Knoxville, TN (US); Frank Kehren, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 115 days.

(21) Appl. No.: 18/262,646

(22) PCT Filed: May 18, 2021

(86) PCT No.: PCT/US2021/070570
§ 371 (c)(1),
(2) Date: Jul. 24, 2023

(87) PCT Pub. No.: WO2022/245400
PCT Pub. Date: Nov. 24, 2022

(65) Prior Publication Data
US 2024/0156423 A1    May 16, 2024

(51) Int. Cl.
*A61B 6/04* (2006.01)
*A61B 6/00* (2024.01)
*A61B 6/03* (2006.01)

(52) U.S. Cl.
CPC ............ *A61B 6/0487* (2020.08); *A61B 6/032* (2013.01); *A61B 6/037* (2013.01); *A61B 6/5294* (2013.01); *A61B 6/545* (2013.01)

(58) Field of Classification Search
CPC ....... A61B 6/0487; A61B 6/032; A61B 6/037; A61B 6/5294; A61B 6/545
See application file for complete search history.

(56) References Cited

U.S. PATENT DOCUMENTS

| 2015/0119703 | A1* | 4/2015 | Mitchell | A61B 6/5294 600/425 |
| 2019/0059831 | A1* | 2/2019 | Hu | A61B 6/5205 |
| 2019/0392265 | A1* | 12/2019 | Spottiswoode | G06T 7/215 |

OTHER PUBLICATIONS

Fotis Kotasidis A et al: "Patient-Specific Hybrid Whole-body PET Parametric Imaging From Speed Modulated Continuous Bed Motion Dynamic Data"; 2017 IEEE Nuclear Science Symposium and Medical Imaging Conference (NSS/MIC); IEEE; Oct. 21, 2017; pp. 1-2.
International Search Report for PCT Application No. PCT/US2021/070570, mailed Feb. 7, 2022.

\* cited by examiner

*Primary Examiner* — Casey Bryant

(57) ABSTRACT

Various systems and computer-implemented methods for high sensitivity continuous bed motion (HS-CBM) scans are disclosed. A HS-CBM scan protocol comprising at least a first zone and a second zone is calculated. The HS-CBM scan maximizes scan sensitivity within an area of interest. A moveable bed is operated at a first movement rate within an imaging field of view of an imaging modality. The first movement rate corresponds to the first zone. The moveable bed is operated at a second movement rate within the imaging field of view of the imaging modality. The second movement rate corresponds to the second zone. A medical image is generated using scan data obtained in the first zone and the second zone.

16 Claims, 14 Drawing Sheets

HIGH SENSITIVITY CONTINUOUS BED MOTION

TECHNICAL FIELD

This application relates generally to medical imaging and, more particularly, to continuous bed motion medical imaging.

BACKGROUND

During medical imaging, a patient is positioned on a table and data is obtained using one or more scanning modalities, such as, for example, computerized-tomography (CT), positron-emission tomography (PET), single-photon emission computerized tomography (SPECT), magnetic resonance (MR) etc. Multiple data sets can be collected for a single patient. Scans may be obtained using different scanning processes, such as step-and-shoot or continuous bed motion (CBM).

CBM scans are performed on a moveable patient bed that is positioned within the imaging area of a medical (e.g., nuclear) imaging system. The moveable patient bed is transitioned from a start position to an end position at a constant or predetermined speed to allow for imaging of a patient over an extended area. Current systems use overscanning, i.e., scanning of areas above and/or below target areas, to ensure complete scanning during CBM.

SUMMARY

In various embodiments, a computer-implemented is disclosed. The computer-implemented method includes calculating a high sensitivity continuous bed motion (HS-CBM) scan protocol including at least a first zone and a second zone. The HS-CBM scan maximizes scan sensitivity within an area of interest. A moveable bed is operated at a first movement rate within an imaging field of view of an imaging modality. The first movement rate corresponds to the first zone. The moveable bed is operated at a second movement rate within the imaging field of view of the imaging modality corresponding to the second zone. A medical image is generated using scan data obtained in the first zone and the second zone.

In various embodiments, a system is disclosed. The system includes an imaging modality defining a field of view having a first longitudinal length, a moveable patient bed having a second longitudinal length greater than the first longitudinal length, and a processors. The moveable patient bed is configured to be moved within the field of view of the imaging modality. The processor is configured to calculate a high sensitivity continuous bed motion (HS-CBM) scan protocol comprising at least a first zone and a second zone. The HS-CBM scan maximizes scan sensitivity within an area of interest. The area of interest has a third longitudinal length greater than the first longitudinal length. The processor is further configured to operate the moveable bed at a first movement rate within the field of view corresponding to the first zone and operate the moveable bed at a second movement rate within the field of view corresponding to the second zone. Imaging data is received from the imaging modality corresponding to the first zone and the second zone and a medical image is generated using the imaging data.

In various embodiments, a computer-implemented is disclosed. The computer-implemented method includes calculating a high sensitivity continuous bed motion (HS-CBM) scan protocol comprising at least a first zone and a second zone. The HS-CBM scan maximizes scan sensitivity within an area of interest that has a longitudinal distance less than a total scan area. The HS-CBM scan protocol is calculated based on a predefined CBM protocol having a continuous movement rate over a CBM scan area that is greater than the total scan area. A total scan time of the HS-CBM scan protocol is equal to a total scan time of the predefined CBM protocol. The method further includes operating a moveable bed at a first movement rate within an imaging field of view of an imaging modality and operating the moveable bed at a second movement rate within the imaging field of view of the imaging modality. The first movement rate corresponds to the first zone and the second movement rate corresponds to the second zone. A medical image is generated using scan data obtained in the first zone and the second zone.

BRIEF DESCRIPTION OF THE DRAWINGS

The following will be apparent from elements of the figures, which are provided for illustrative purposes and are not necessarily drawn to scale.

DETAILED DESCRIPTION

This description of the exemplary embodiments is intended to be read in connection with the accompanying drawings, which are to be considered part of the entire written description.

In the following, various embodiments are described with respect to the claimed providing systems as well as with respect to the claimed methods. Features, advantages or alternative embodiments herein can be assigned to the other claimed objects and vice versa. In other words, claims for the providing systems can be improved with features described or claimed in the context of the methods. In this case, the functional features of the method are embodied by objective units of the providing system.

Figure 1:
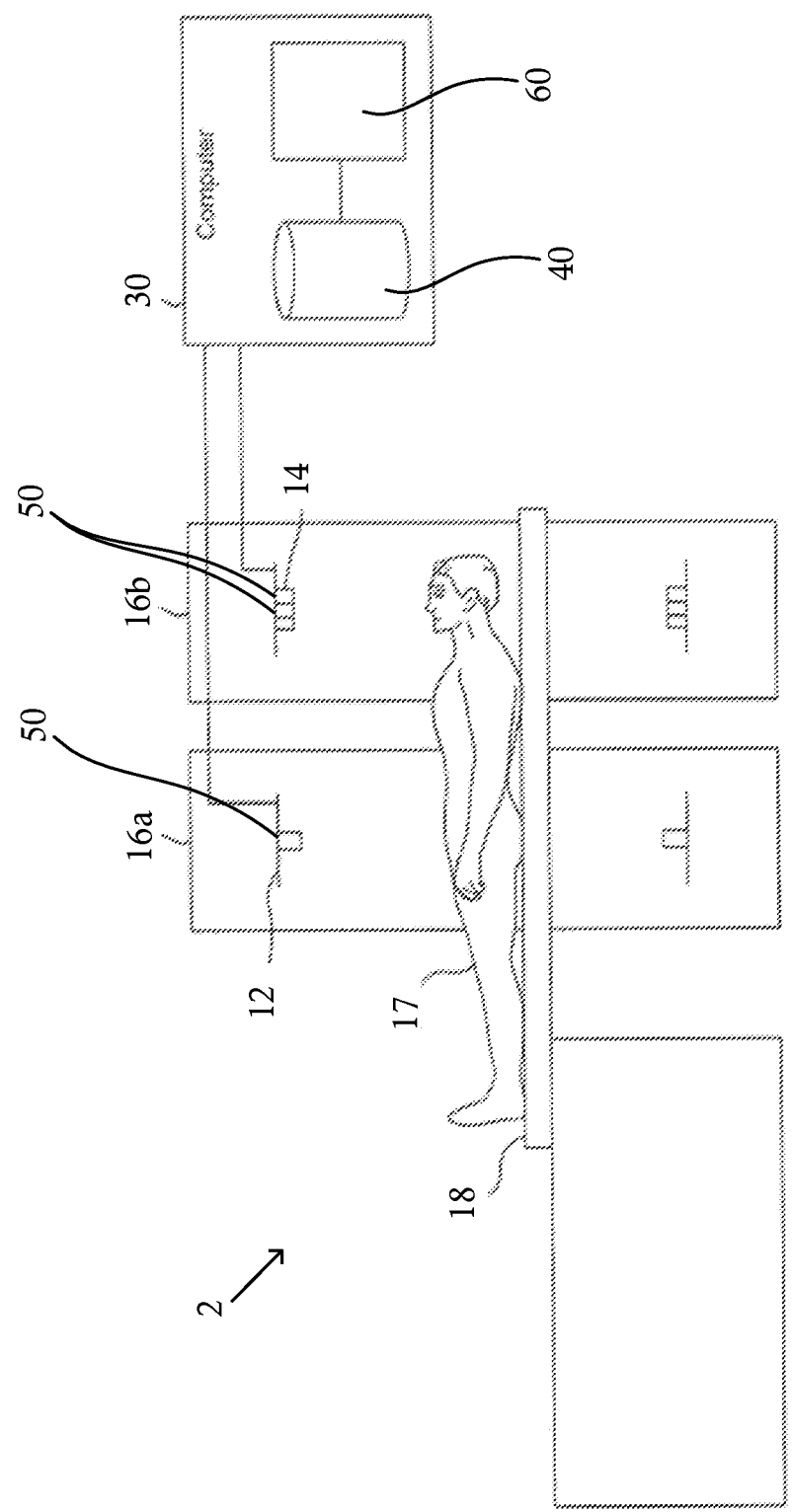
FIG. 1 illustrates a nuclear imaging system, in accordance with some embodiments.

FIG. 1 illustrates one embodiment of a nuclear imaging system 2, in accordance with some embodiments. The nuclear imaging system 2 includes a scanner for at least a first modality 12 provided in a first gantry 16a. The first modality 12 can include any suitable imaging modality, such as a positron emission tomography (PET) modality, a single-photon emission computerized tomography (SPECT) modality, a computerized tomography (CT) modality, a magnetic resonance (MR) modality, etc. A patient 17 lies on a movable patient bed 18 that is movable between and/or within a gantry. In some embodiments, the nuclear imaging system 2 includes a scanner for a second imaging modality 14, which can be collocated with the first imaging modality and/or provided in a second gantry 16b. The second imaging modality 14 can be any suitable imaging modality, such as, for example, a PET modality, a SPECT modality, a CT modality, a MR modality, and/or any other suitable imaging modality. Each of the first imaging modality 12 and/or the second imaging modality 14 can include one or more detectors 50 configured to detect an annihilation photon, gamma ray, and/or other nuclear imaging event.

Scan data from the first modality 12 and/or the second modality 14 is stored at one or more computer databases 40 and processed by one or more computer processors 60 of a computer system 30. The graphical depiction of computer system 30 in FIG. 1 is provided by way of illustration only, and computer system 30 can include one or more separate computing devices. The nuclear imaging data sets can be provided by the first modality 12, the second modality 14, and/or can be provided as a separate data set, such as, for example, from a memory coupled to the computer system 30. The computer system 30 can include one or more processing electronics for processing a signal received from one of the plurality of detectors 50.

In some embodiments, the computer system 30 is configured to generate one or more reconstructions based on the nuclear imaging data obtained by the first modality 12 and/or the second modality 14. Each reconstruction can be generated using any suitable reconstruction parameters, such as any suitable reconstruction algorithms, noise values, event counts, etc. The reconstruction(s) can be generated based on attenuation-corrected scan data.

Figure 2:
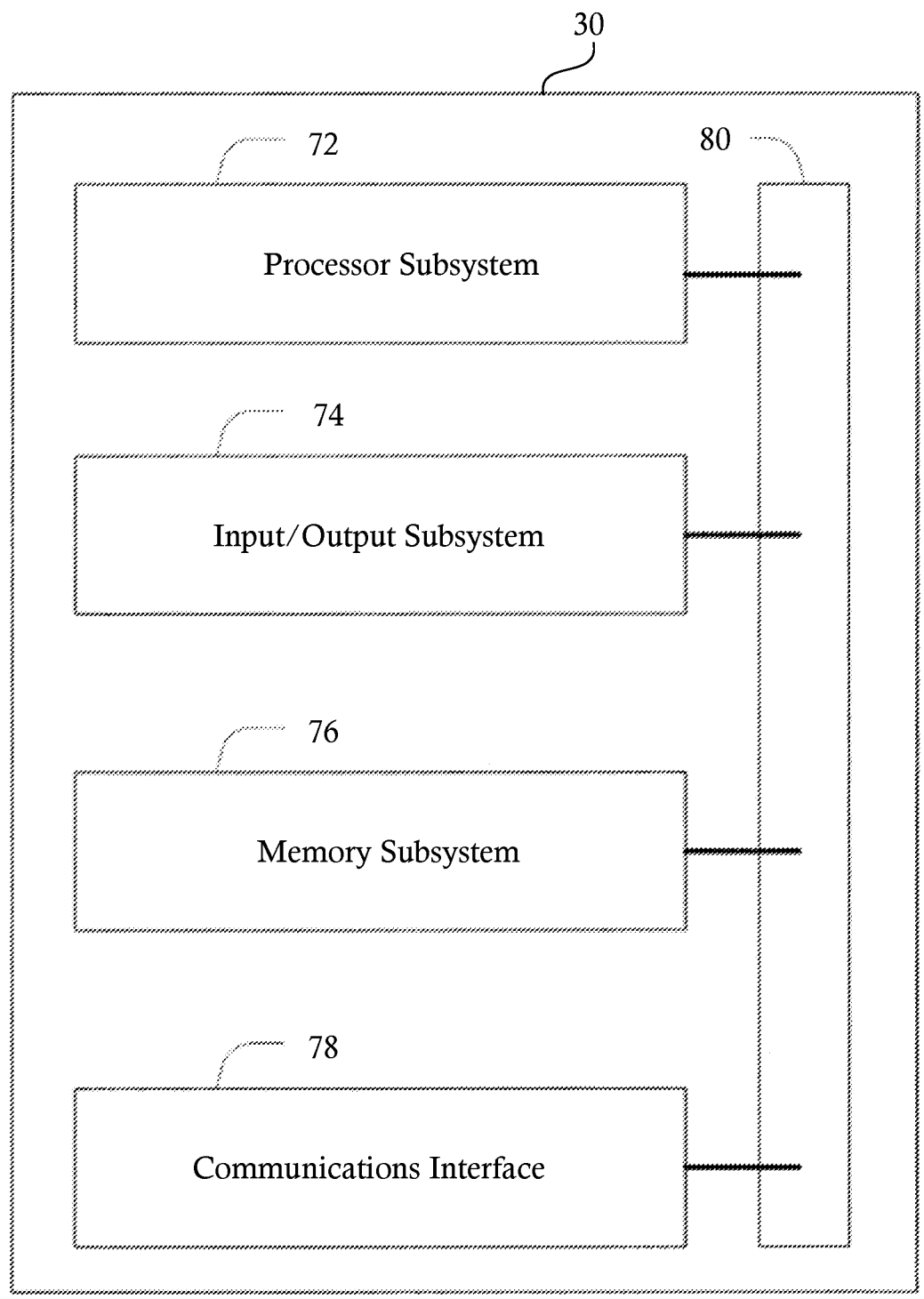
FIG. 2 illustrates a block diagram of a computer system, in accordance with some embodiments.

FIG. 2 illustrates a computer system 30 configured to implement one or more processes, in accordance with some embodiments. The system 30 is a representative device and can include a processor subsystem 72, an input/output subsystem 74, a memory subsystem 76, a communications interface 78, and a system bus 80. In some embodiments, one or more than one of the system 30 components can be combined or omitted such as, for example, not including an input/output subsystem 74. In some embodiments, the system 30 can comprise other components not shown in FIG. 2. For example, the system 30 can also include, for example, a power subsystem. In other embodiments, the system 30 can include several instances of a component shown in FIG. 2. For example, the system 30 can include multiple memory subsystems 76. For the sake of conciseness and clarity, and not limitation, one of each component is shown in FIG. 2.

The processor subsystem 72 can include any processing circuitry operative to control the operations and performance of the system 30. In various aspects, the processor subsystem 72 can be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 72 also can be implemented by a controller, a microcontroller, an application specific integrated circuit (ASIC), a field programmable gate array (FPGA), a programmable logic device (PLD), and so forth.

In various aspects, the processor subsystem 72 can be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 30 can include a system bus 80 that couples various system components including the processing subsystem 72, the input/output subsystem 74, and the memory subsystem 76. The system bus 80 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCM-CIA), Small Computers Interface (SCSI) or other proprietary bus, or any custom bus suitable for computing device applications.

In some embodiments, the input/output subsystem 74 can include any suitable mechanism or component to enable a user to provide input to system 30 and the system 30 to provide output to the user. For example, the input/output subsystem 74 can include any suitable input mechanism, including but not limited to, a button, keypad, keyboard, click wheel, touch screen, motion sensor, microphone, camera, etc.

In some embodiments, the input/output subsystem 74 can include a visual peripheral output device for providing a display visible to the user. For example, the visual peripheral output device can include a screen such as, for example, a Liquid Crystal Display (LCD) screen. As another example, the visual peripheral output device can include a movable display or projecting system for providing a display of content on a surface remote from the system 30. In some embodiments, the visual peripheral output device can include a coder/decoder, also known as Codecs, to convert digital media data into analog signals. For example, the visual peripheral output device can include video Codecs, audio Codecs, or any other suitable type of Codec.

The visual peripheral output device can include display drivers, circuitry for driving display drivers, or both. The visual peripheral output device can be operative to display content under the direction of the processor subsystem 72. For example, the visual peripheral output device can be able to play media playback information, application screens for application implemented on the system 30, information regarding ongoing communications operations, information regarding incoming communications requests, or device operation screens, to name only a few.

In some embodiments, the communications interface 78 can include any suitable hardware, software, or combination of hardware and software that is capable of coupling the system 30 to one or more networks and/or additional devices. The communications interface 78 can be arranged to operate with any suitable technique for controlling information signals using a desired set of communications protocols, services or operating procedures. The communications interface 78 can include the appropriate physical connectors to connect with a corresponding communications medium, whether wired or wireless.

Vehicles of communication comprise a network. In various aspects, the network can include local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules can communicate in accordance with a number of wired protocols. Examples of wired protocols can include Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 78 can include one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 78 can include a wireless interface comprising one or more antennas, transmitters, receivers, transceivers, amplifiers, filters, control logic, and so forth.

In various aspects, the communications interface 78 can provide data communications functionality in accordance with a number of protocols. Examples of protocols can include various wireless local area network (WLAN) protocols, including the Institute of Electrical and Electronics Engineers (IEEE) 802.xx series of protocols, such as IEEE 802.11a/b/g/n/ac, IEEE 802.16, IEEE 802.20, and so forth. Other examples of wireless protocols can include various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols can include wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols can include near-field communication techniques and protocols, such as electro-magnetic induction (EMI) techniques. An example of EMI techniques can include passive or active radio-frequency identification (RFID) protocols and devices. Other suitable protocols can include Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 76.

In some embodiments, the memory subsystem 76 can include any machine-readable or computer-readable media capable of storing data, including both volatile/non-volatile memory and removable/non-removable memory. The memory subsystem 76 can include at least one non-volatile memory unit. The non-volatile memory unit is capable of storing one or more software programs. The software programs can contain, for example, applications, user data, device data, and/or configuration data, or combinations therefore, to name only a few. The software programs can contain instructions executable by the various components of the system 30.

In various aspects, the memory subsystem 76 can include any machine-readable or computer-readable media capable of storing data, including both volatile/non-volatile memory and removable/non-removable memory. For example, memory can include read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 76 can contain an instruction set, in the form of a file for executing various methods, such as methods including A/B testing and cache optimization, as described herein. The instruction set can be stored in any acceptable form of machine readable instructions, including source code or various appropriate programming languages. Some examples of programming languages that can be used to store the instruction set comprise, but are not limited to: Java, C, C++, C #, Python, Objective-C, Visual Basic, or .NET programming. In some embodiments a compiler or interpreter is comprised to convert the instruction set into machine executable code for execution by the processing subsystem 72.

Figure 3:
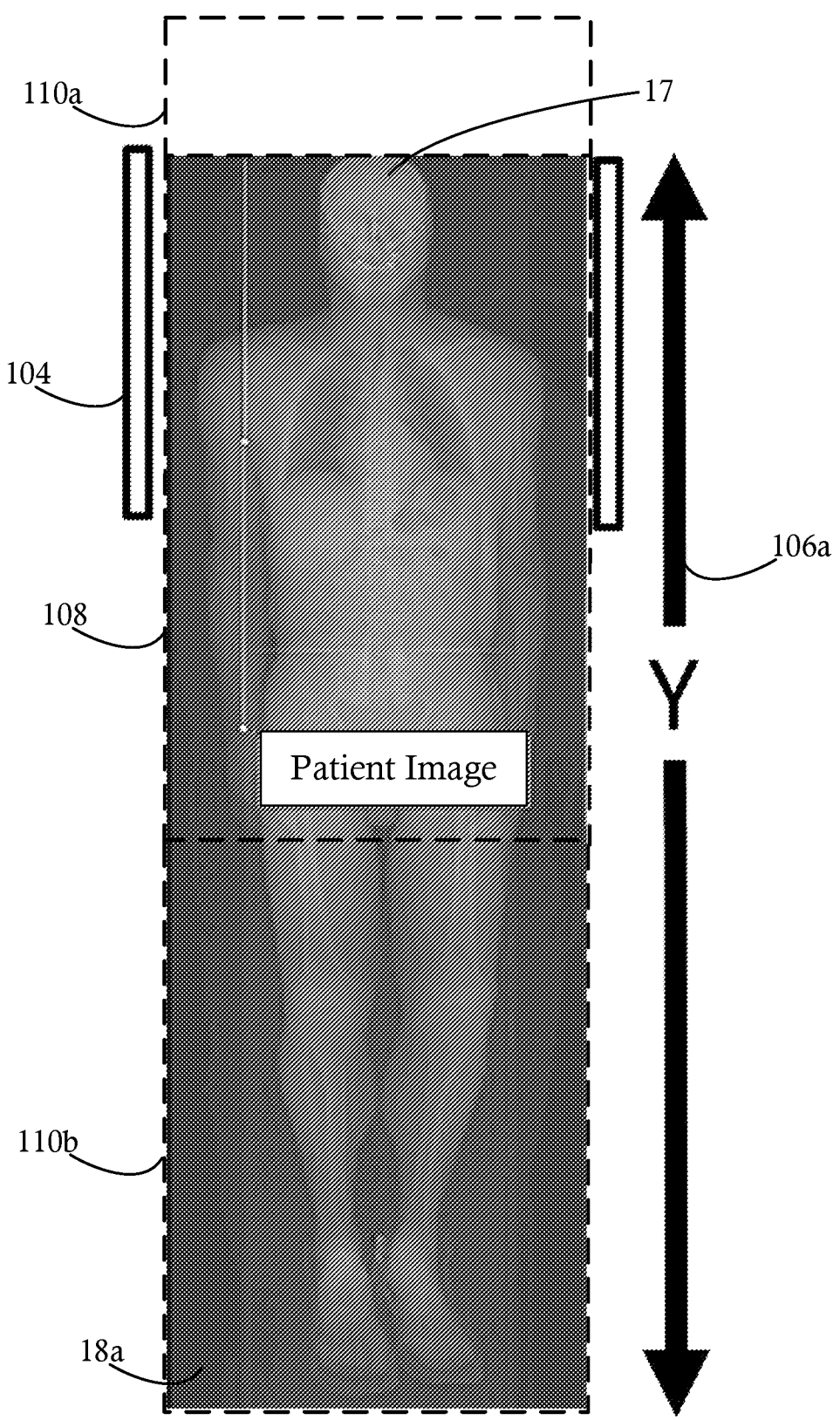
FIG. 3 illustrates movement of a moveable patient bed through a field of view of an imaging modality during a traditional continuous bed motion scan, in accordance with some embodiments.

FIG. 3 illustrates movement of a moveable patient bed through a field of view 104 of an imaging modality during a traditional continuous bed motion scan, in accordance with some embodiments. In some embodiments, an imaging modality, such as the first imaging modality 12 and/or the second imaging modality 14 discussed above, has a predetermined field of view 104. The field of view 104 includes a three-dimensional volume defined by the cross-sectional area of the imaging modality 12, 14 (i.e., the distribution of the detectors 50) over a predetermined distance in a first direction, referred to herein as the longitudinal direction. The first, or longitudinal, direction typically corresponds to a superior-inferior direction of a patient 17 positioned on a moveable patient bed, such as the moveable patient bed 18a. The field of view 104 may typically be less than the longitudinal length of a moveable patient bed, such as the moveable patient bed 18a, necessitating movement of the moveable patient bed 18a through the field of view 104 (or alternatively, movement of a gantry 16a, 16b supporting the imaging modality 12, 14 to move the field of view 104) to allow complete imaging of a total scan area 106. Movement of the moveable patient bed 18a occurs in the longitudinal direction (as defined by the field of view 104). The total scan area 106 may be greater than, equal to, or less than a length of a moveable patient bed 18a.

In some embodiments, imaging is performed by the imaging modality 12, 14 to obtain image data (e.g., count data) that includes an area of interest 108. The area of interest 108 includes one or more anatomical locations and/or structures of a patient, such as a head, chest, abdomen, etc. In some embodiments, the area of interest 108 includes a total longitudinal distance that is greater than the field of view 104 of the imaging modality 12, 14. In traditional continuous bed motion (CBM) scans, the moveable patient bed 18a is transitioned through the field of view 104 of the imaging modality 12, 14 in the longitudinal direction at a constant speed and/or user defined speeds to allow the total scan area 106a (e.g., the entire length of the moveable patient bed 18a) to pass through the field of view 104. Image data, such as list-mode data, may be recorded simultaneous and/or separate from position data of the bed to allow for binning of the image data and generation of sinograms.

As shown in FIG. 3, in traditional CBM scans, the total scan area 106 includes over scan areas 110a, 110b. A first over scan area 110a is located superior to the area of interest 108 and a second over scan area 110b located inferior of the area of interest 108. In traditional CBM, the over scan areas 110a, 110b are scanned to provide sufficient sensitivity (e.g., sufficient counts) in the area of interest 108 to provide a clinically-useful image. The over scan areas 110a, 110b may include additional portions of a patient's anatomy that are not of interest during the CBM scan. For example, a patient's arms may be positioned over their head and located in the first over scan area 110a and/or the patient's lower extremities (e.g., legs, feet) may be located in the second over scan area 110b. In addition, equipment required for performing an imaging procedure may be located in one or more of the over scan areas 110a, 110b. For example, medical equipment, such as an injection syringe, catheter, and/or other device for delivering a tracer to the patient, monitoring equipment, and/or other medical equipment may be located in the first over scan area 110a.

When reconstructing an image from data obtained by a traditional CBM scan, data corresponding to bins located in the over scan areas 110a, 110b may be discarded. For example, data for one or more bins corresponding to a patient's lower extremities may be discarded when the area of interest 108 encompasses only a patient's head, chest and abdomen. Similarly, data for one or more bins corresponding to an area located superior to the patient's head may be discarded. Image data, e.g., counts, generate during scanning of the over scan areas 110a, 110b may introduce complications into reconstruction of the area of interest 108, such as an increased rate of randoms, dead time, and/or pulse pile-up. As one example, an increased random rate, dead time, and/or pulse pile-up may be caused by a tracer source (e.g., syringe, catheter, etc.) located in or near an over scan area 110a, 110b, such as an injection syringe and/or catheter positioned within the first over scan area 110a at the top of the moveable patient bed 18a.

Figure 4:
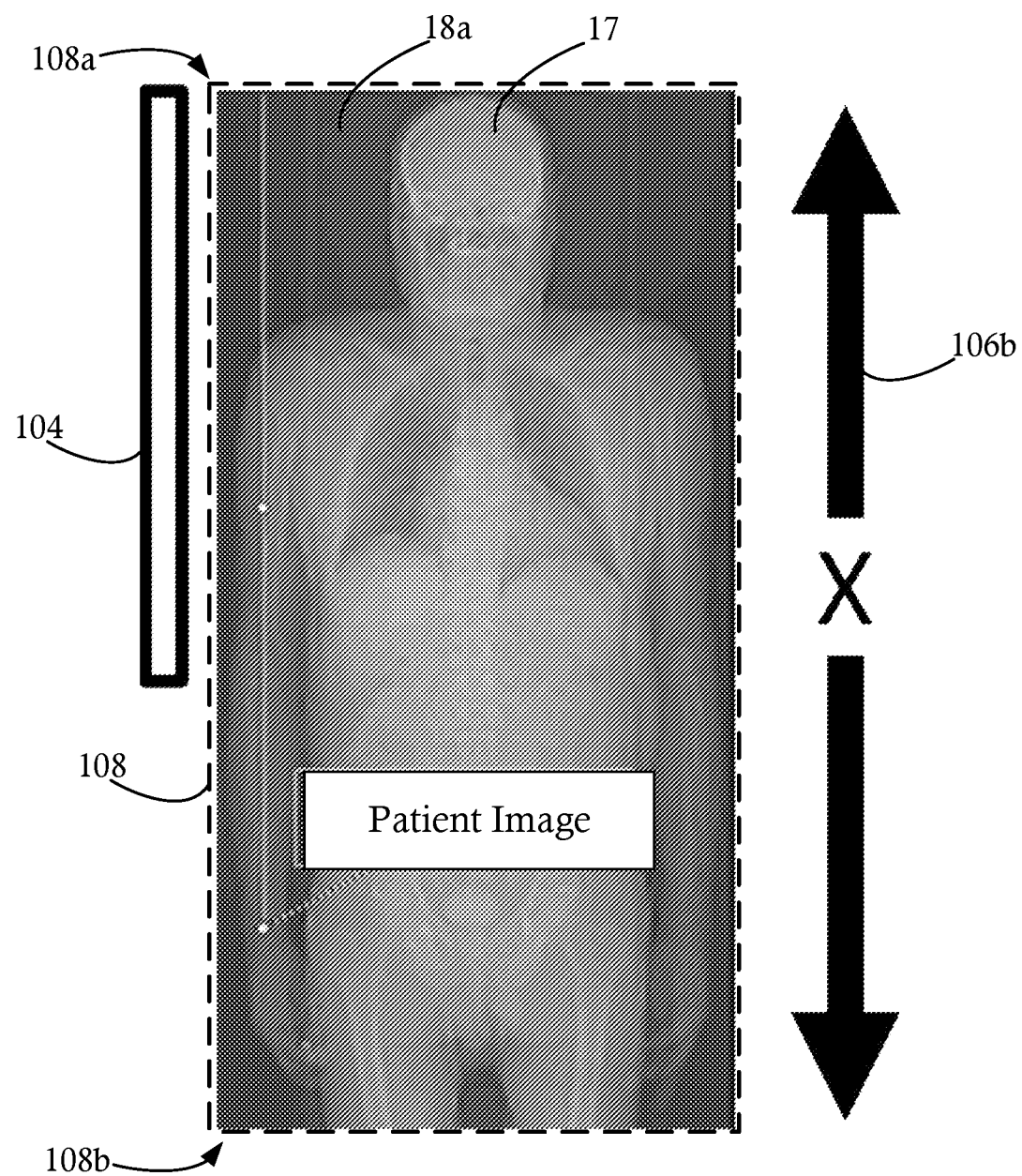
FIG. 4 illustrates movement of a moveable patient bed through a field of view of an imaging modality during a high sensitivity continuous bed motion scan, in accordance with some embodiments.

FIG. 4 illustrates movement of a moveable patient bed 18a through a field of view 104 of an imaging modality during a high sensitivity CBM scan (HS-CBM scan), in accordance with some embodiments. During a HS-CBM scan, movement of the movable patient bed 18a is limited such that only total scan area 106b and the area of interest 108 entirely overlap such that only the area of interest 108 is transitioned through the field of view 104 during the HS-CBM scan. For example, in some embodiments, the moveable patient bed 18a is moveable from a first position 108a corresponding to a superior-most portion of the area of interest 108 to a second position 180b corresponding to an inferior end of the area of interest 108. Although embodiments are illustrated with the first position 108a being located superior to the second location 108b, it will be appreciated that the moveable patient bed 18*a* may be transitioned from a superior to inferior position and/or from an inferior to a superior position. As compared to the traditional CBM scan discussed in conjunction with FIG. 3, a HS-CBM scan eliminates or reduces the over scan areas 110*a*, 110*b* and is focused only on the area of interest 108. In some embodiments, physical bed collision limits, user defined bed speeds, and/or other parameters can be entered so that a maximum scan range can be provided to the user. In some embodiments, the maximum scan range can be calculated directly, using a look-up table, numerically, using methods such as Artificial Intelligence (AI), using any other suitable calculation method, and/or any combination thereof. Determination of the maximum scan range enables scanning of longer patients and/or assists patient positioning.

In some embodiments, a HS-CBM scan includes the same scan time as a traditional CBM scan, but the total scan time is spent only in area of interest 108 in a HS-CBM scan. The rate of movement of the moveable patient bed 18*a* can be reduced for an HS-CBM scan as compared to the traditional CBM scan, as the distance traveled during the HS-CBM scan is less than the distance traveled during at traditional CBM scan. The reduced speed during the HS-CBM scan provides increased comfort to the patient 17 and allows easier access to the patient 17, for example, to deliver additional tracer, check vitals, communicate with the patient, etc.

In the illustrated embodiment, the area of interest 108 is less than twice longitudinal length of the field of view 104, allowing minimal movement of the moveable patient bed 18*a* during a HS-CBM scan. For example, in some embodiments, the moveable patient bed 18*a* may be continuously moved at a constant, slow rate allowing transition from the first position 108*a* to the second position 108*b* over the total scan time. In embodiments having an area of interest 108 only slightly larger than the field of view 104 of the imaging modality 12, 14, such movement may be provided at a rate that is barely perceptible to the patient undergoing the scan. In some embodiments, the movement rate (S) may be determined as:

$$S = \frac{\text{Scan Area} - \text{Gantry Length}}{\text{Total Scan Time}}$$

In other embodiments, and as discussed in greater detail below, the movement rate may be variable over the total scan time to provide for increased focus in one or more areas during the HS-CBM scan. In some embodiments, the movement rate is based on one or more unidirectional and/or bi-directional (e.g., multiple passes used in parametric PET) movement.

In various embodiments, the variable scan time can be calculated directly, pre-calculated as a look up table, calculated numerically, calculated using artificial Intelligence type algorithms, using any other suitable calculation method, and/or any combination thereof. In some embodiments, the scan time can be calculated numerically as an optimization function that iteratively converges to the optimal scan protocol, or scan speeds that will results in the optimal counts to be detected from the volume of interest. For example, in some embodiments, user defined user speeds are obtained and the sensitivity curves for a traditional CBM are generated. Bed speeds for a HS-CBM scan protocol including variable scan times can be numerically calculated such that the user defined speed ratios are preserved but more of the total scan time is spent in region(s) of interest (e.g., areas with one or more voxels of interest), thereby increasing the sensitivity of the scanned region.

Figure 5:
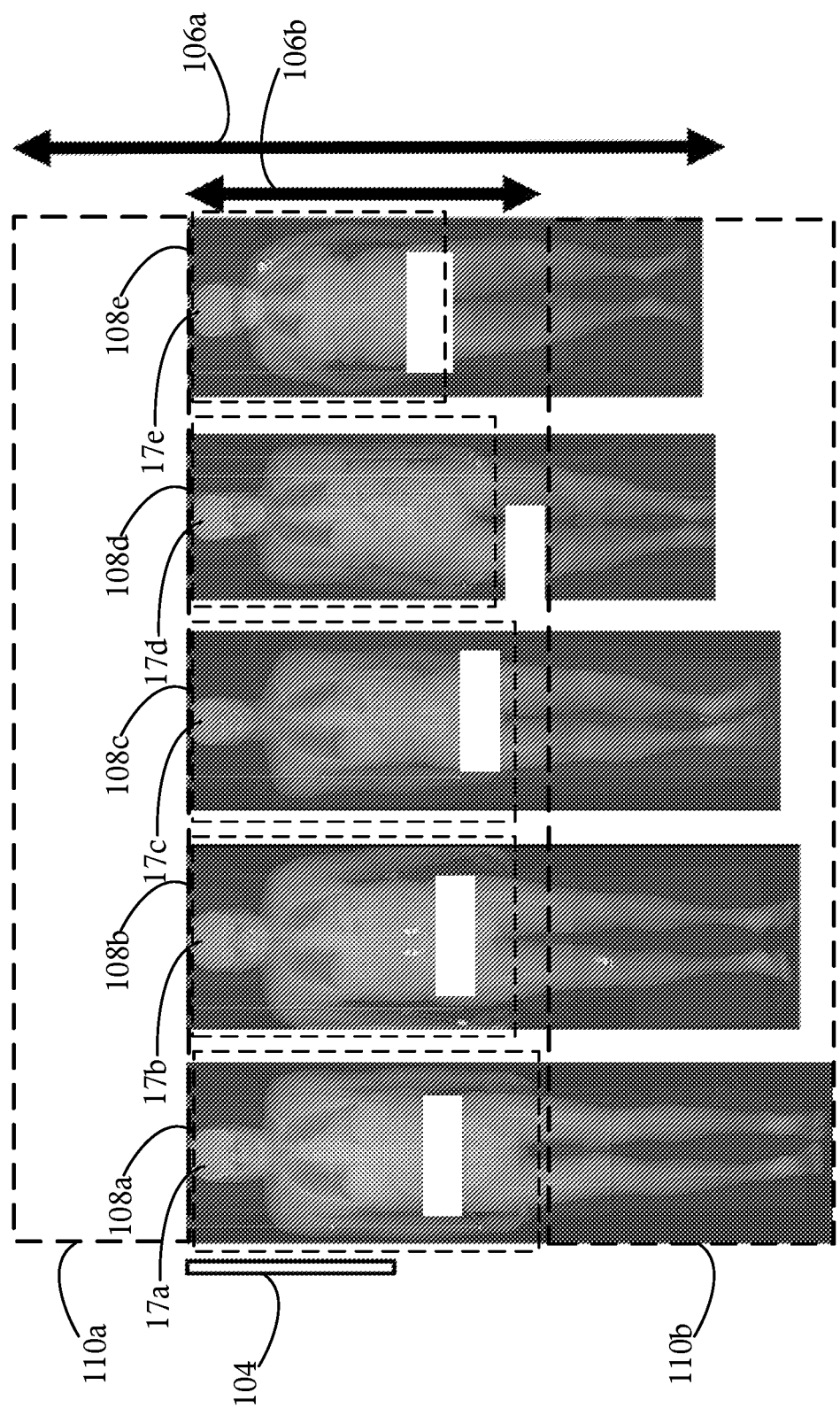
FIG. 5 illustrates scan coverage of a plurality of patients utilizing both a high sensitivity continuous bed motion scan and a traditional continuous bed motion scan, in accordance with some embodiments.

FIG. 5 illustrates scan coverage of a plurality of patients 17*a*-17*e* utilizing both a HS-CBM scan and a traditional CBM scan, in accordance with some embodiments. As illustrated in FIG. 5, the area of interest 108 has a larger longitudinal length than the field of view 104 of an imaging modality 12, 14. For a traditional CBM scan, the total scan area 106*a* includes over scan areas 110*a*, 110*b*. During the traditional CBM scan, the moveable patient bed 18*a* is continuously transitioned at a user-defined rate of speed to move the entire scan area 106*a* through the field of view 104 of the imaging modality 12, 14. As shown in FIG. 5, the over scan areas 110*a*, 110*b* may extend significantly beyond not only the area of interest 108*a*-108*e* but also beyond the anatomy of the patient 17*a*-17*e* generally. As discussed above, inclusion of the over scan areas 110*a*, 110*b* may introduce complications into a reconstruction, for example, randoms, dead time, and/or pulse pile-up caused by a tracer source located in or near one of the over scan areas 110*a*, 110*b*.

In contrast, for a HS-CBM scan, the total scan area 106*b* is substantially overlapping with the area of interest 108*a*-108*e* for each patient 17*a*-17*e*. The total movement of the moveable patient bed 18*a* during the HS-CBM scan is substantially reduced as compared to the movement necessary during a traditional CBM scan. For example, in some embodiments, a traditional CBM scan may require the moveable patient bed to transition over a length of about 3 meters, whereas a HS-CBM scan may only require transition over a length of about 1 meter. In some embodiments, the traditional CBM scan and the HS-CBM scan are performed over the same total scan time, resulting in a lower rate of movement of the moveable patient bed 18*a* for the HS-CBM scan.

During a HS-CBM scan, the moveable patient bed 18*a* may be continuously transitioned from a first position to a second position at a second movement rate. The second movement rate is less than the first movement rate of a traditional CBM scan. For example, in the embodiment discussed above, the HS-CBM scan moves one-third the distance of the traditional CBM scan. Over the same total scan time, the second movement rate during the HS-CBM scan is one-third the first movement rate of the traditional CBM scan. The lower movement speed increases patient comfort, provides easier access to the patient and/or equipment co-located with the patient, and increases the sensitivity over the scan area. In some embodiments, and as discussed in greater detail below, the movement speed of the moveable patient bed 18*a* may be varied during a HS-CBM scan, for example, to increase sensitivity of the scan.

Figure 6:
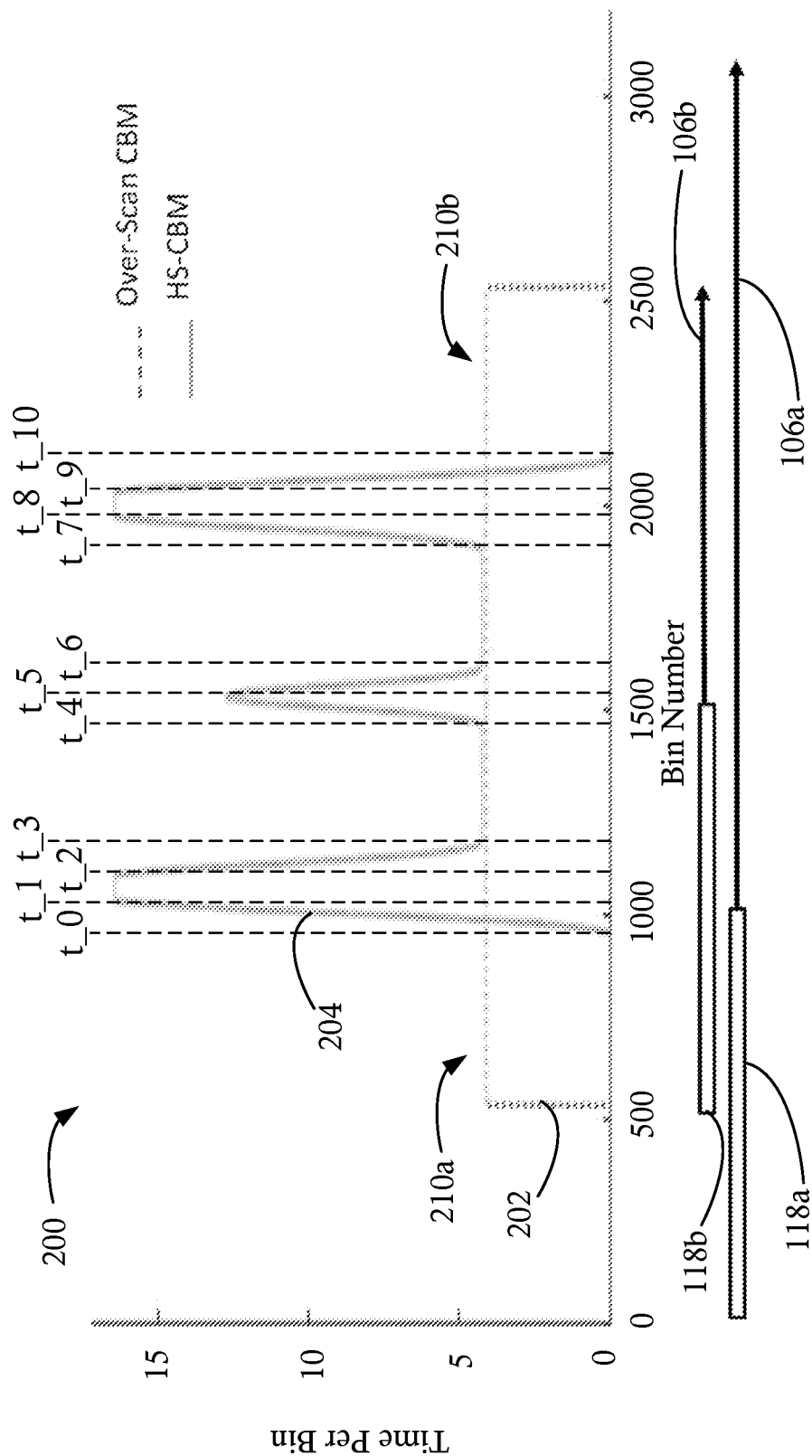
FIG. 6 is a chart illustrating time spent imaging per bin for a traditional continuous bed motion scan and a high sensitivity continuous bed motion scan having a variable movement rate, in accordance with some embodiments.

FIG. 6 is a chart 200 illustrating time spent imaging per bin for a traditional CBM scan 202 and a HS-CBM scan 204 having a variable movement rate, in accordance with some embodiments. The time spent imaging per bin 202, 204 corresponds to movement of a moveable patient bed, such as moveable patient bed 18, 18*a*, during a scan. For example, as illustrated in FIG. 6, during a traditional CBM scan 202, the moveable patient bed 118*a* is transitioned from a first position (e.g., a superior-most or inferior-most position) to a second position (e.g., superior-most or inferior-most position) at a constant speed. Because the moveable patient bed moves at a constant rate, the time spent imaging each bin is the same for all bins in the image. In addition, the traditional CBM scan 202 includes time spent imaging bins 210a, 210b in the over scan areas.

In contrast, the HS-CBM scan 204 includes a variable time per bin, which corresponds to variation in the movement rate of the moveable patient bed 118b during the HS-CBM scan. The variable movement rate increases and/or decreases time spent in each imaging bin. The movement rate of the moveable patient bed 118b during various portions of the HS-CBM scan 204 may be selected to maximize on one or more parameters of the scan, such as maximizing sensitivity of the HS-CBM scan in a predetermined area.

As shown in the illustrated embodiment, the moveable patient bed 118b starts at an initial position at time t_0. From time t_0 to time t_1, the time spent per bin increases from 0 seconds to about 16 seconds, corresponding to an acceleration of the moveable patient bed 118a from a stopped position to a first movement rate from time t_1 to time t_2. From time t_1 to time t_2, the movement rate of the moveable patient bed 118b is maintained at the first movement rate. The time per bin from time t_1 to time t_2 is constant, corresponding to the first movement rate.

At time t_2, the movement rate is increased from the first movement rate to the second movement rate. In the illustrated embodiment, the second movement rate is equal to the movement rate used during the traditional CBM scan. The time per bin from time t_3 to time t_4 decreases, corresponding to the increase in speed from the first movement rate to the second movement rate. The second movement rate is maintained from time t_3 to time t_4, providing a constant time per bin. In the illustrated embodiment, the time per bin from time t_3 to time t_4 is equal to the time per bin of a traditional CBM scan.

At time t_4, the movement rate of the moveable patient bed 118b is reduced from the second movement rate to a third movement rate. The time per bin increases from time t_4 to time t_5. At time t_5, the movement rate of the moveable patient bed 118b is increased to the second movement rate, decreasing the time per bin from time t_5 to time t_6. The movement rate of the moveable patient bed 118b is maintained at the second movement rate from time t_6 to time t_7, corresponding to a constant time per bin over the same range. The time per bin from time t_6 to time t_7 is equal to the time per bin from time t_3 to time t_4, which as discussed above, is equal to the time per bin of a traditional CBM scan.

At time t_7, the movement rate of the moveable patient bed 118b is reduced from the second movement rate to the first movement rate, with a corresponding increase in time per bin from time t_7 to time t_8. The movement rate is held constant from time t_8 to time t_9, corresponding to a constant time per bin in the same range. The time per bin from time t_8 to time t_9 is the same as the time per bin from time t_1 to time t_2 due to the two time periods having the same movement rate of the moveable patient 118b. At time t_9, the movement rate of the moveable patient bed 118b is reduced from the first movement rate to zero and, at time t_10, the HS-CBM scan is completed, with a corresponding drop in the time per bin. Although specific times per bin and movement speeds are illustrated, it will be appreciated that any suitable time per bin and corresponding movement rate of the moveable patient bed 118b may be used based on the goals of the HS-CBM scan. In addition to increased sensitivity in specific bins of interest, the HS-CBM scan omits the imaging bins in the over scan areas 210a, 210b.

Figure 7:
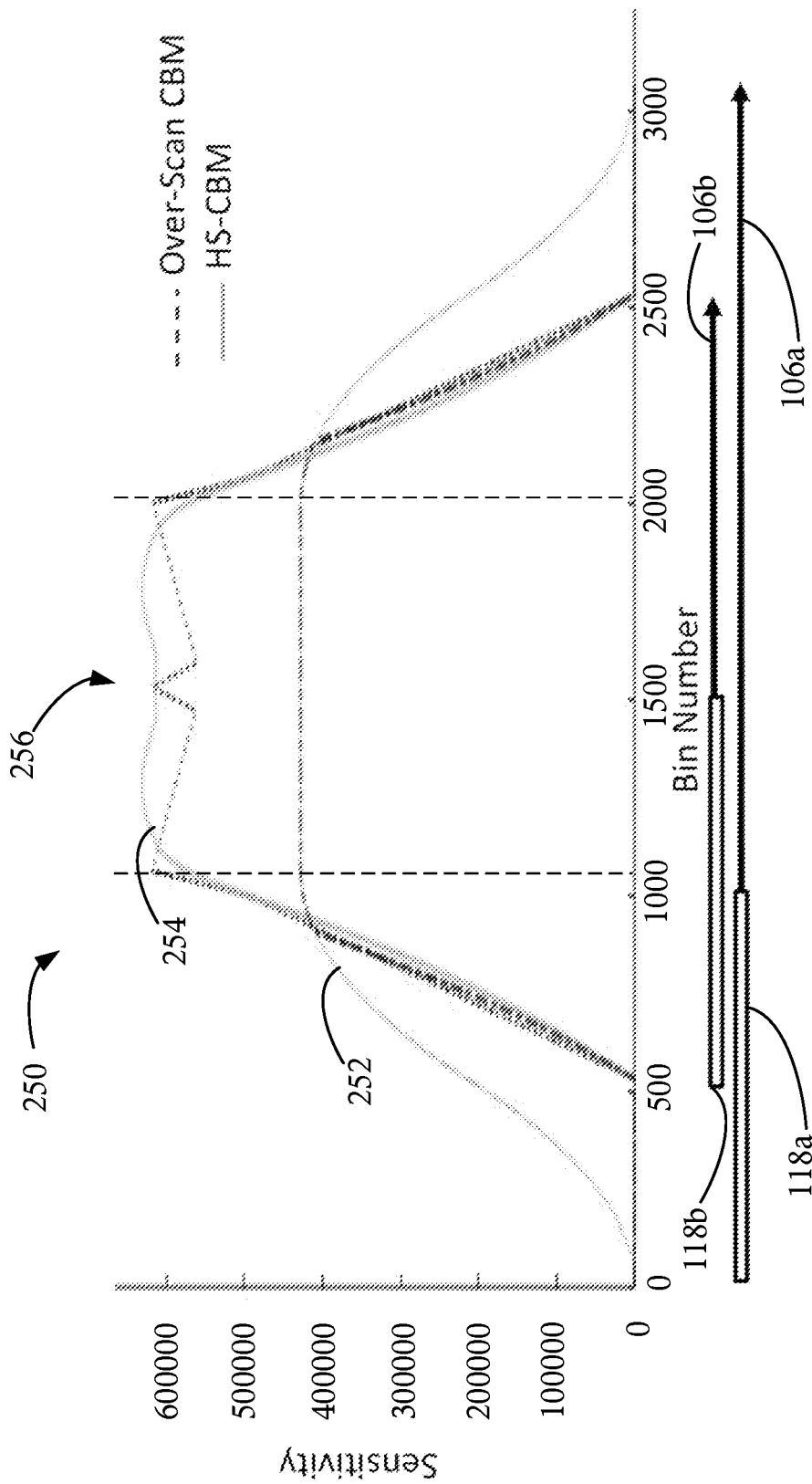
FIG. 7 is a chart illustrating sensitivity of the traditional continuous bed motion scan and the high sensitivity continuous bed motion scan illustrated in FIG. 6, in accordance with some embodiments.

FIG. 7 is a chart 250 illustrating sensitivity of the traditional CBM scan 252 and the HS-CBM scan 254 illustrated in FIG. 6, in accordance with some embodiments. As shown in FIG. 7, the sensitivity of the traditional CBM scan 252 over the area of interest 256 is less than the sensitivity of the HS-CBM scan 254 over the area of interest 256. The increased sensitivity is provided by the variable movement of the moveable patient bed 118b over the HS-CBM scan (as discussed above in conjunction with FIG. 6). For example, in some embodiments, movement of the moveable patient bed 18 is determined based on the location of one or more anatomical structures and/or the interaction of certain anatomical structures and a tracer, for example, absorption rate, scattering, etc. The time spent imaging each bin, as shown in FIG. 6, may be selected to provide a substantially constant sensitivity over the area of interest 256, as illustrated in FIG. 7. In other embodiments, the movement rate of the moveable patient bed 118b may be configured to maximize one or more other parameters of a scan and/or to maximize certain parameters during certain portions of a HS-CBM scan.

In some embodiments, the scan times (for example t_1 to t_10 shown in FIG. 6) can vary such that a HS-CBM scan models user defined scan ranges. The scan times per bin can be determined by calculating a desired sensitivity curve as shown in FIG. 7 and numerically calculating a scan time per bin that matches the desired sensitivity curve. The sensitivity curve can be calculated using, for example, user defined scan ranges with overscan for a traditional CBM scan to generate a HS-CBM protocol including scan times per bin having the time spent in the overscan range (in a traditional CBM scan) modulated over the user defined scan time. In various embodiments, the numerical maximization step to calculate the HS-CBM scan times can be an optimization algorithm, a direct calculation, an AI based method, a look-up table, any other suitable calculation method, and/or a combination thereof.

Figure 8:
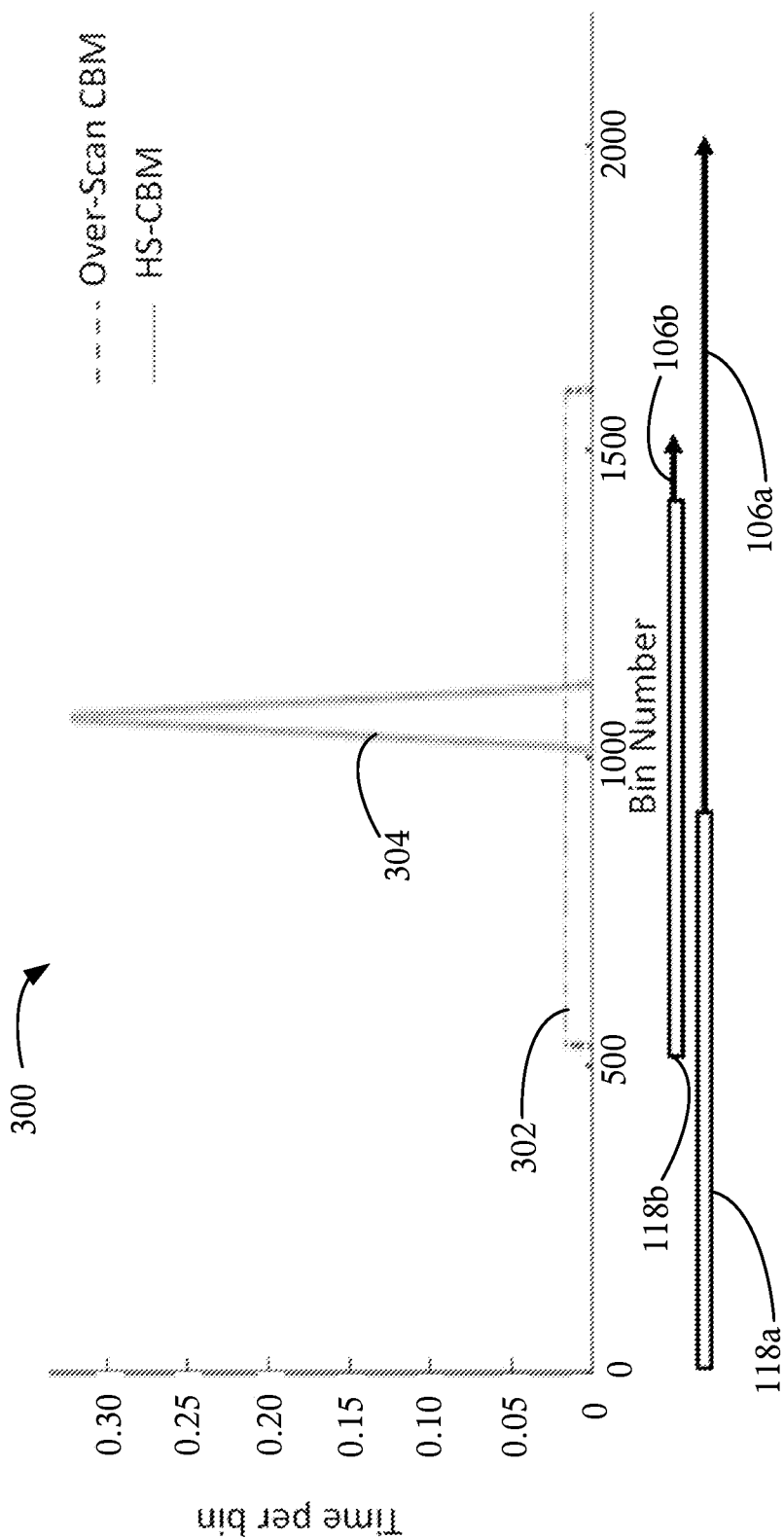
FIG. 8 is a chart illustrating time spent imaging each bin for a traditional continuous bed motion scan and a high sensitivity continuous bed motion scan for a scan having an area of interest only slightly larger than a field of view of an imaging modality, in accordance with some embodiments.

FIG. 8 is a chart 300 illustrating time spent imaging each bin for a traditional CBM scan 302 and a HS-CBM scan 304 for a scan having an area of interest only slightly larger than a field of view of an imaging modality 12, 14, in accordance with some embodiments. For example, in some embodiments, an area of interest may be 1070 mm in a longitudinal direction and the field of view of the relevant imaging modality 12, 14 may be 1060 mm in the same direction, resulting in a difference of only 10 mm. Although specific embodiments are discussed herein, it will be appreciated that the total scan area and/or field of view of the imaging modality 12, 14 (and thus the difference between the total scan area and the field of view) may be any suitable size.

As shown in FIG. 8, and similar to the traditional CBM scan shown in FIG. 6, the time per bin 302 for each bin in a traditional CBM scan 302 can be constant over the scan area 106a of the traditional CBM scan 302, corresponding to a possibility of a constant movement rate of the moveable patient bed 118a during the traditional CBM scan 302. The moveable patient bed 118a traverses a first scan distance 106a, such as, for example, 2 meters, during the traditional CBM scan. The traditional CBM scan also includes over scan areas 310a, 310b.

In contrast, the time per bin of the HS-CBM scan 304 is concentrated in the bins corresponding to area of interest, resulting in a small scan distance 106b and, similarly, a slow rate of movement of the moveable patient bed 118b over the scan distance 106b. For example, in the illustrated embodiment, the time per bin for the traditional CBM scan 302 is less than 0.05 seconds for all bins, while the time per bin for the HS-CBM scan 304 increases rapidly above 0.05 seconds, peaks above 0.3 seconds, and quickly falls back to zero. The shorter scan distance 106b of the HS-CBM scan 304 provides for a slower movement rate over the scan period, increasing patient comfort, access to the patient, and generally improving outcomes of a scan. Additional and/or alternatively, the total scan time may be reduced for an HS-CBM scan as compared to a traditional CBM scan without a reduction, or in some instances with an improvement, in sensitivity during the scan.

Figure 9:
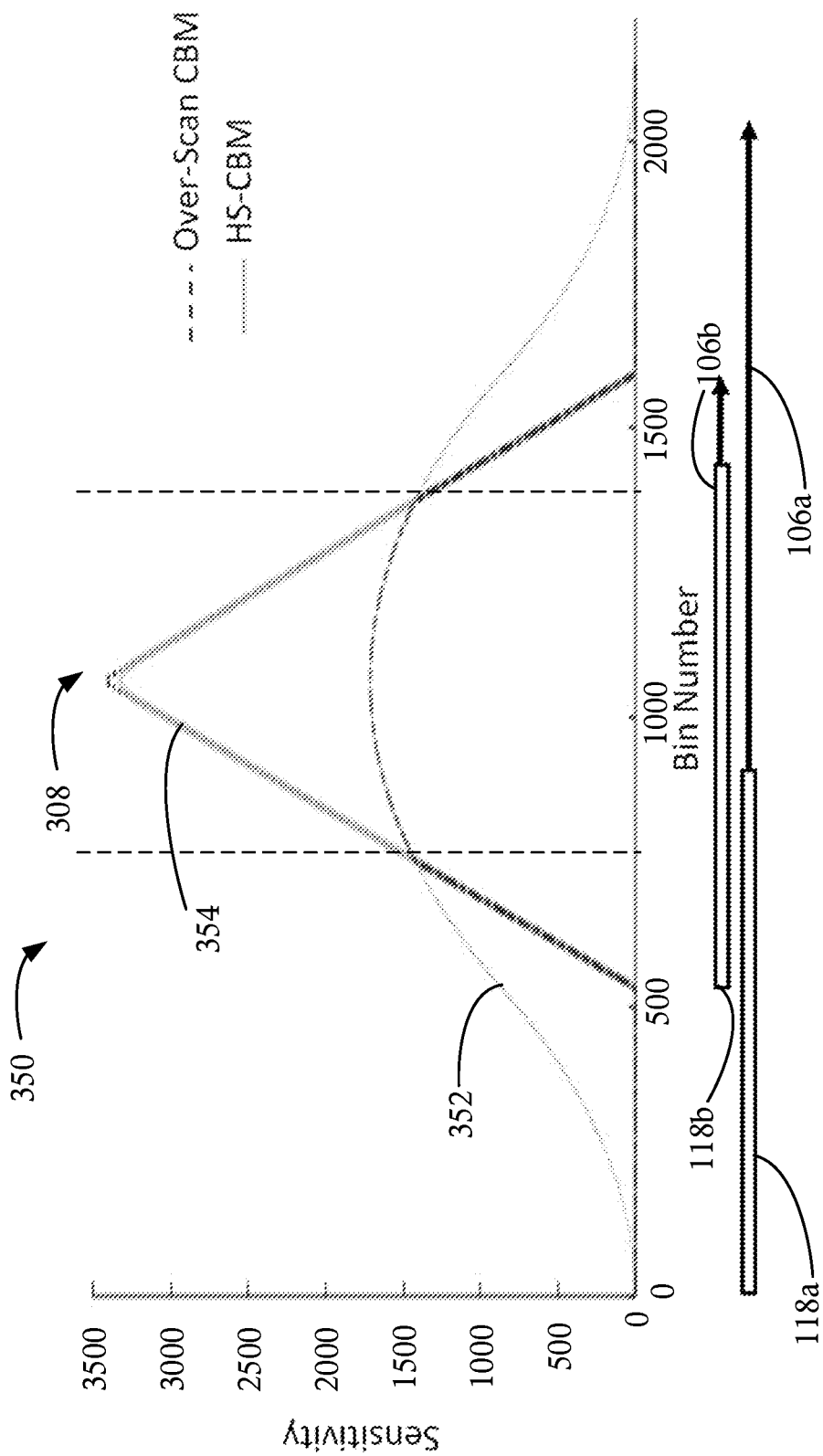
FIG. 9 is a chart illustrating the sensitivity of the traditional continuous bed motion scan and the high sensitivity continuous bed motion scan illustrated in FIG. 8, in accordance with some embodiments.

FIG. 9 is a chart 350 illustrating the sensitivity of the traditional CBM scan 352 and the HS-CBM scan 354 illustrated in FIG. 8, in accordance with some embodiments. As shown in FIG. 9, the sensitivity of the traditional CBM scan 352 increases smoothly from 0 to a maximum at a midpoint of the scan and drops off at the same rate to the end of the scan. The traditional CBM scan 352 includes over scan areas 310a, 310b. In contrast, the HS-CBM scan 354 has a sensitivity that increases sharply at the start of the scan and a higher maximum sensitivity over the majority of the scan area 106b as compared to the traditional CBM scan 352. In addition, the HS-CBM scan 354 omits the over scan areas 310a, 310b. The HS-CBM scan 354 can provide a higher sensitivity, i.e., better scan quality within the area of interest 308, over the same total scan time and/or over a shorter time scan as compared to traditional CBM scans.

Figure 10:
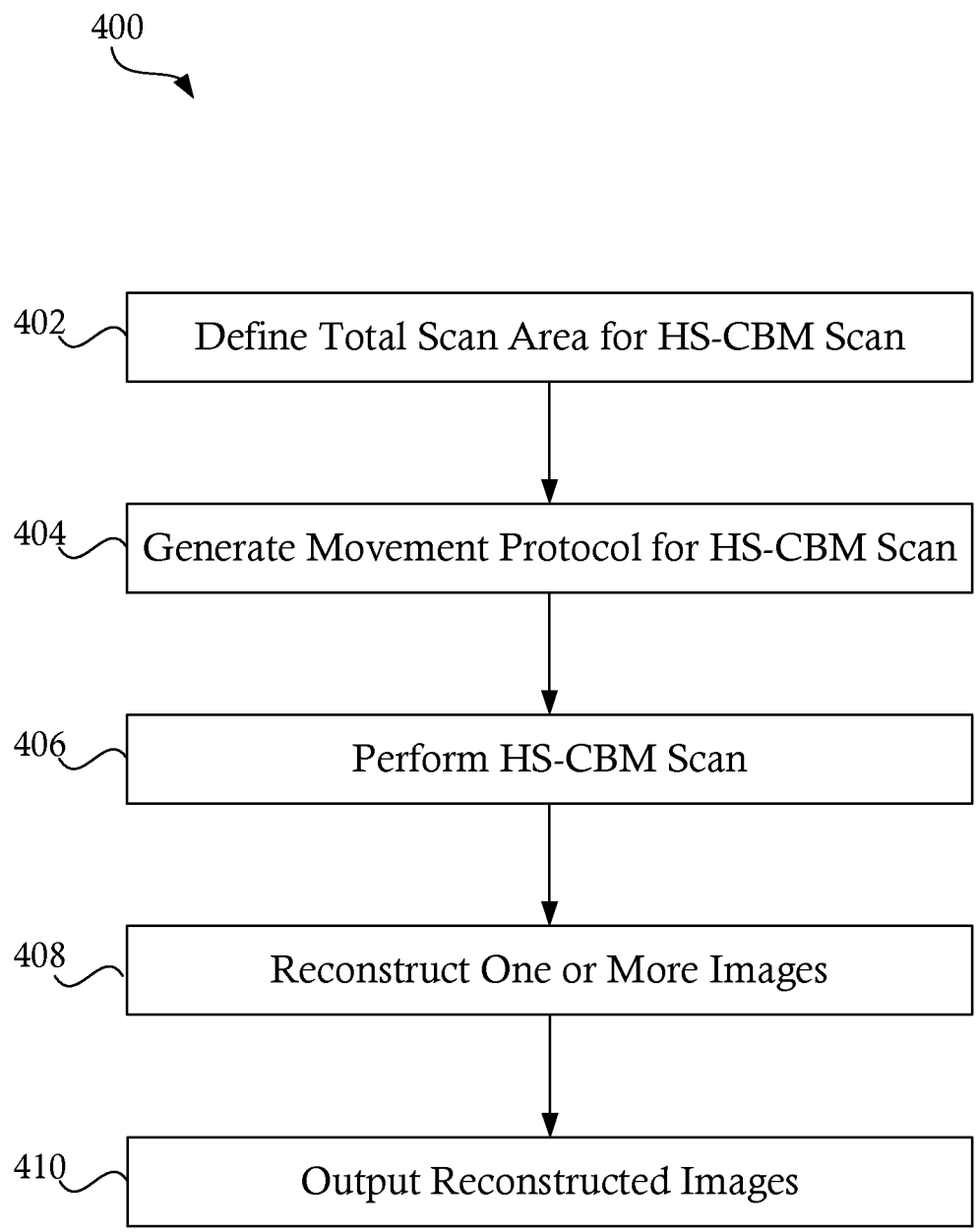
FIG. 10 is a flowchart illustrating a method of performing a high sensitivity continuous bed motion scan, in accordance with some embodiments.

FIG. 10 is a flowchart 400 illustrating a method of performing a HS-CBM scan, in accordance with some embodiments. At step 402, a total scan area is defined. The total scan area may be based on a size of the gantry 18, one or more patient parameters (e.g., height, torso length, etc.), and/or any other suitable parameters. For example, in some embodiments, a total scan area may be configured to provide a scan area focused on the head and abdomen of a patient. Although specific embodiments are discussed herein, it will be appreciated that the scan area may be focused on any suitable portion of the patient anatomy.

At step 404, a movement protocol including movement rates for one or more portions (or legs) of a HS-CBM scan is calculated. The movement rate may be calculated based on one or more target scan parameters. For example, in some embodiments, movement rate for one or more portions of a HS-CBM scan may be configured to maximize sensitivity over the scan period. Sensitivity may be maximized based on expected positions of one or more anatomical structures and/or the tracer used in conjunction with one or more imaging modalities 12, 14. In some embodiments, calculating movement rates includes numerically determining the optimal scan protocol that iteratively minimizes a difference between an initial estimate of the total scan time (e.g., all zeros or ones depending on algorithm used) and the desired sensitivity pattern defined by the user for the HS-CBM scan.

For example, in some embodiments, a user provides, for example, a predetermined number of scan zones, such as up to 4 scan zones, with varying scan speed. A predetermined algorithm is configured to determine the total scan time with over scan (e.g., calculate a tradition CBM scan protocol) and numerically determine the optimal scan time per bin (or scan time per mm) for HS-CBM that matches the scan protocol defined by the user (e.g., as determined for the traditional CBM scan). As another example, in some embodiments, a user defines a total scan time and a relative scan time for each zone. The scan time that provides the flattest sensitivity during a HS-CBM scan is calculated and the user define scan zones are modulates over the calculated scan time, for the same total scan time as compared to a traditional CBM scan. The sensitivity profiles used in the optimization cost function can be one-dimensional and/or of higher dimensions. The maximum and minimum bed speeds, the in/out collision limits of the bed, and the location of the metal support to hold the beds are entered as limits in the numerical algorithm so that the optimal scan protocol selected by HS-CBM does not go beyond these ranges.

In some embodiments, after calculating the HS-CBM scan times, for example, either numerically or directly, the calculated scan times can be provided as training datasets to an AI model along with the user defined scan zones. Any suitable AI model and/or algorithm configured to or capable of mapping the user defined scan times to a numerically calculated HS-CBM scan protocol may be used, such as, for example, a U-NET and/or any other suitable AI algorithm. The machine learning algorithm can be trained for varying gantry size, scan lengths, user define scan range, scan times, and/or other scan parameters.

For example, in one embodiment, sensitivity of a head, chest, and abdomen of a patient may be maximized using a movement protocol including five portions (or zones) having three movement rates: a first portion from a start of a scan to a first position having a first movement rate, a second portion extending from the first position to a second position performed at a second movement rate, a third portion extending from the second position to a third position and corresponding to a midpoint of the scan performed at a third movement rate, a fourth portion extending from the third position to a fourth position performed at the second movement rate, and a fifth portion extending from the fourth position to an end position of the scan performed at the first movement rate. Although specific embodiments are discussed herein, it will be appreciated that any suitable movement protocol may be applied to maximize any suitable scan parameters.

Figure 11:
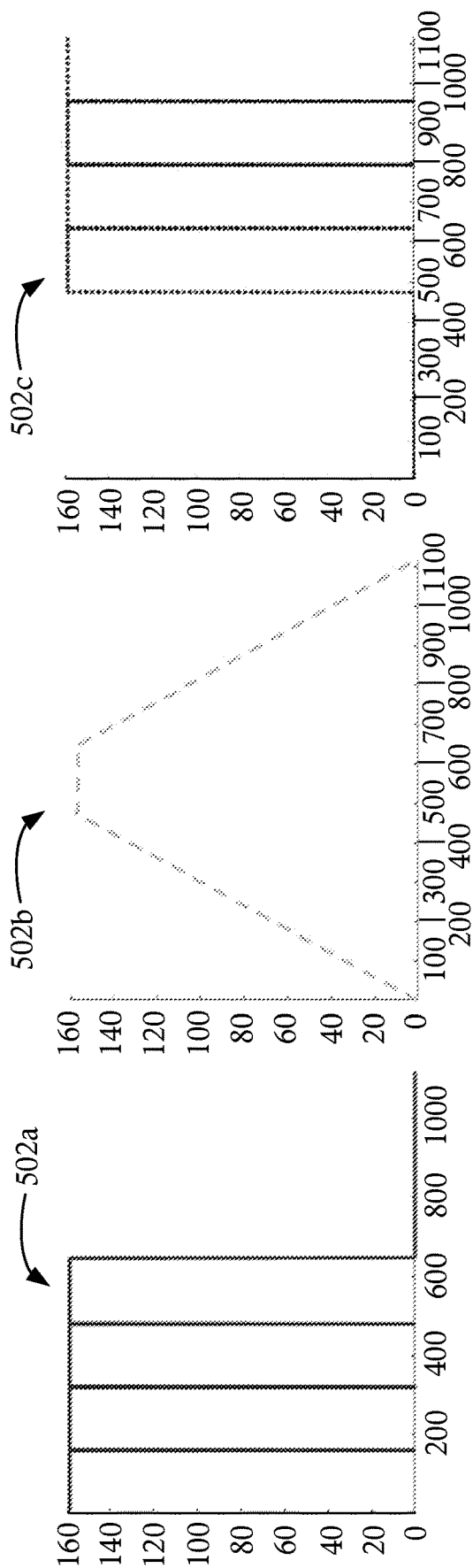
FIG. 11 is a set of charts illustrating a sensitivity profile of a high sensitivity continuous bed motion scan including a combination of one or more step-and-shoot scans and one or more continuous bed motion scans, in accordance with some embodiments.
Figure 12A:
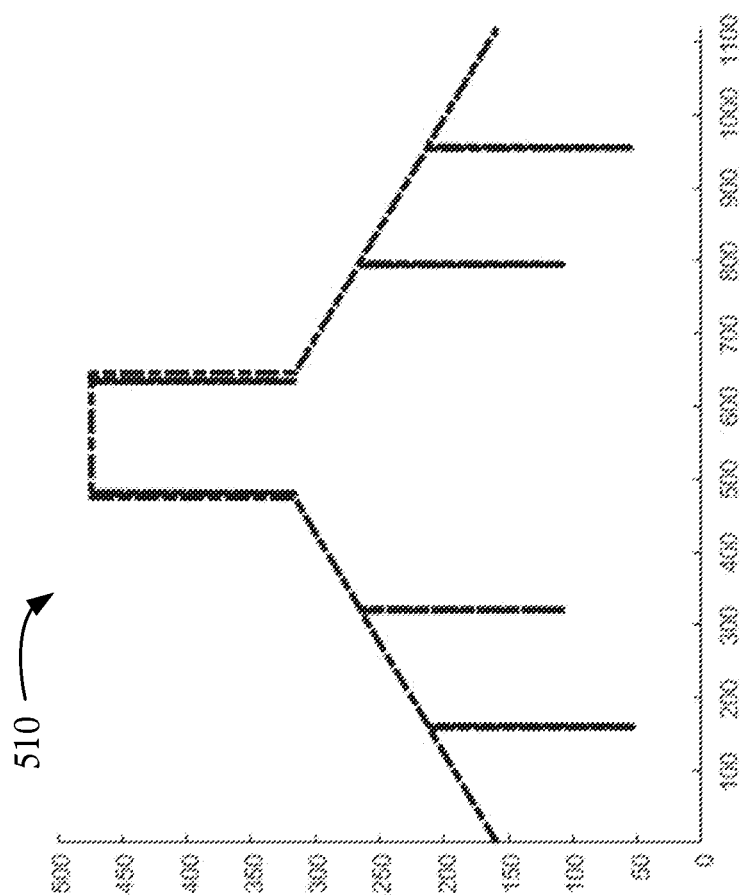
FIG. 12A is a chart illustrating a combined sensitivity profile for the high sensitivity continuous bed motion scan of FIG. 11, in accordance with some embodiments.
Figure 12C:
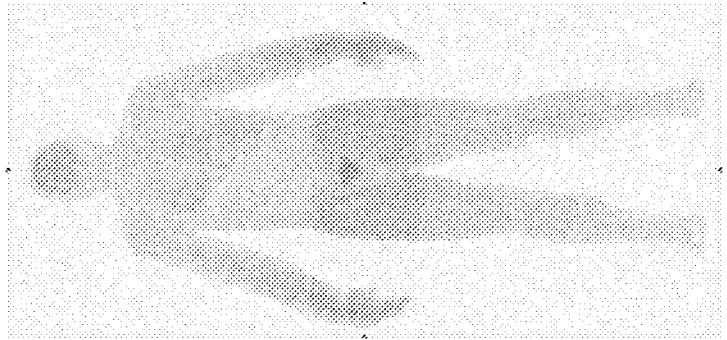
FIG. 12C illustrates projection data for segment zero of the high sensitivity continuous bed motion scan illustrated in FIG. 11, in accordance with some embodiments.
Figure 12B:
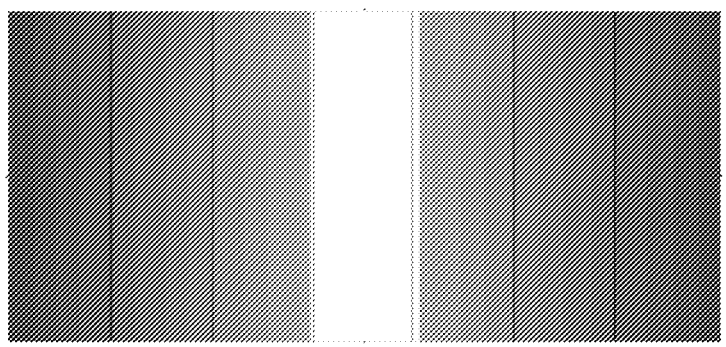
FIG. 12B illustrates an ideal norm for the combined sensitivity profile of FIG. 12A, in accordance with some embodiments.
Figure 13B:
FIG. 13B illustrates a reconstructed image obtained by the high sensitivity continuous bed motion scan of FIG. 11, in accordance with some embodiments.
Figure 13A:
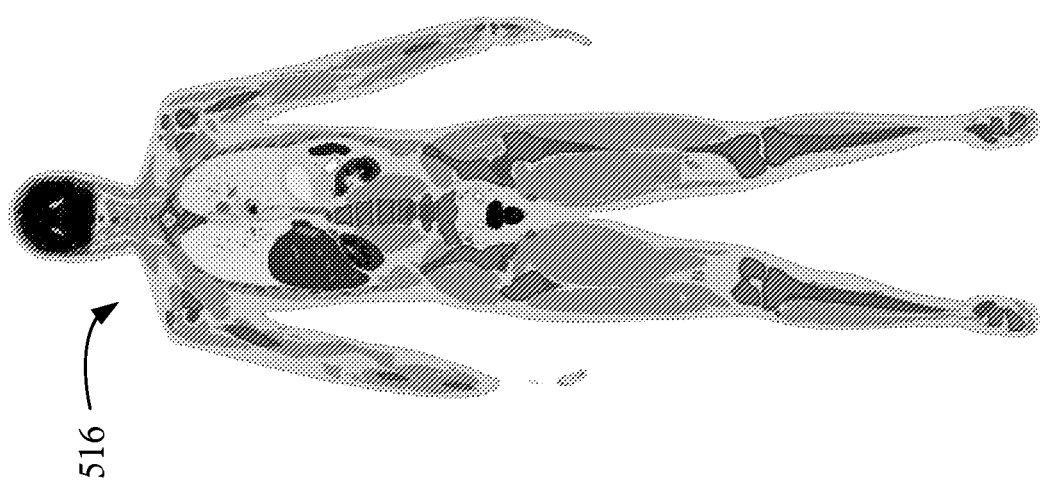
FIG. 13A illustrates a phantom image for the high sensitivity continuous bed motion scan of FIG. 11, in accordance with some embodiments.

Although the above disclosed examples include a HS-CBM scan protocol having varying speed, it will be appreciated that the HS-CBM protocol may include other movement protocols, for example, incorporating stationary scanning (such as used in step-and-shoot imaging) and continuous speed movement. For example, FIG. 11 is a set of charts 502a-502c illustrating a sensitivity profile of a high sensitivity continuous bed motion scan including a combination of stationary scanning 502a, 502c at the beginning and/or end of a scan protocol and one or more continuous bed motion scans 502b, in accordance with some embodiments. As illustrated in FIG. 11, in some embodiments, a complete bed stop can be used within HS-CBM to generate optimized sensitivity profiles, for example, as desired by a user and/or determined by one or more algorithms. In the illustrated embodiment, the HS-CBM scan protocol includes a first stationary scan, illustrated by the first chart 502a, a CBM scan performed at a constant rate, illustrated by the second chart 502b, and a second stationary scan, illustrated by the third chart 502c. Although specific embodiments are illustrated herein, it will be appreciated that any combination of stationary, constant speed, and/or variable speed scans may be combined to formed a HS-CBM protocol. FIG. 12A is a chart 510 illustrating a combined sensitivity profile for the high sensitivity continuous bed motion scan of FIG. 11, FIG. 12B illustrates an ideal norm 512 for the combined sensitivity profile of FIG. 12A, and FIG. 12C illustrates projection data 514 for segment zero of the high sensitivity continuous bed motion scan illustrated in FIG. 11, in accordance with some embodiments. FIG. 13A illustrates a phantom image 516 for the high sensitivity continuous bed motion scan of FIG. 11 and FIG. 13B illustrates a reconstructed image 518 obtained by the high sensitivity continuous bed motion scan of FIG. 11, in accordance with some embodiments Although embodiments are illustrated having two stationary positions in combination with a CBM scan of constant speed, it will be appreciated that a HS-CBM scan can consist of different combinations of stationary bed positions and/or CBM scans with constant and/or varying speeds.

In various embodiments, the HS-CBM protocols disclosed herein also incorporate any necessary modification(s) regarding bed position, bed tags, scan time, singles rates, bed speed, etc. to provide for data transfer from a data acquisition step to a reconstruction step so that one or more images can be reconstructed faithfully. In some embodiments, HS-CBM protocol includes a revised normalization performed during the reconstruction to match the scanning protocol of HS-CBM scan.

At step 406, an HS-CBM scan is performed according to the scan protocol determined at step 404. The HS-CBM scan is limited to the predetermined scan area and movement of the gantry 18 is determined by the scan protocol. The speed of the gantry 18 is reduced over the scan period as compared to a traditional CBM scan having the same scan period. For example, the distance moved by a gantry 18 during a typical CBM scan may be about 3 meters whereas the distance moved by the gantry 18 during a HS-CBM scan is less, such as, for example, about 1 meter. As the gantry 18 is moving a shorter total distance over the total scan time, the movement of the gantry can be reduced to increase patient comfort. Reduced movement of the gantry 18 also allows a clinician access to the patient, for example, to check and/or adjust a catheter delivering a contrast (e.g., tracer) agent, check vital signs, reposition a patient, etc.

At step 408, one or more images are reconstructed from data obtained during the HS-CBM scan at step 406. The images may be reconstructed using any suitable CBM reconstruction process known in the art. For example, various CBM processes are described in co-owned U.S. Pat. Nos. 9,645,261 and 9,044,153, each of which is incorporated herein by reference in their entireties. In some embodiments, the reconstructed images includes the application of one or more attenuation correction processes. In some embodiments, one or more changes can be applied to a norm expansion step so as to incorporate the change in bed speeds during a HS-CBM scan with greater accuracy. For example, in some embodiments, the variation in bed speed can be captured during the rebinning step and the variations can be conveyed to the norm expansion in the form of a bed tag with the corresponding singles rate for dead time correction. The limited scan area of the HS-CBM scan reduces the number of randoms, dead time, and/or pulse pile-ups that must be addressed during attenuation correction, improving the sensitivity of the final scan image.

At step 410, the reconstructed images are output to one or more other systems or structures. For example, in some embodiments, the reconstructed images are output to a monitor, printer, and/or other visual output device for review by a clinician. As another example, in some embodiments, the reconstructed images are output to a non-transitory storage device, such as an internal storage, external storage, cloud storage, etc. Although specific embodiments are discussed herein, it will be appreciated that any suitable output may be generated by a computer configured to generate a reconstructed image.

A first embodiment includes a computer-implemented method. The method includes the steps of calculating a high sensitivity continuous bed motion (HS-CBM) scan protocol comprising at least a first zone and a second zone, operating a moveable bed at a first movement rate within an imaging field of view of an imaging modality, operating the moveable bed at a second movement rate within the imaging field of view of the imaging modality, generating a medical image using scan data obtained in the first zone and the second zone. The HS-CBM scan maximizes scan sensitivity within an area of interest. The first movement rate corresponds to the first zone and the second movement rate corresponds to the second zone.

In the first embodiment, the HS-CBM scan protocol can be calculated based on a total scan time.

In the first embodiment, the HS-CBM scan protocol can be calculated numerically as an optimization function configured to optimize counts to be detected within the area of interest.

In the first embodiment, a total scan area of the HS-CBM scan protocol can substantially overlap with the area of interest.

In the first embodiment, at least one of the first movement rate or the second movement rate can include a variable time per bin.

In the first embodiment, at least one of the first movement rate or the second movement rate can be zero.

In the first embodiment, the HS-CBM scan protocol can be calculated based on a predefined CBM protocol having a continuous movement rate over a CBM scan area.

In the first embodiment, the CBM scan area can be greater than a total scan area of the HS-CBM scan protocol.

A second embodiment discloses a system including an imaging modality defining a field of view having a first longitudinal length, a moveable patient bed having a second longitudinal length greater than the first longitudinal length, and a processor. The moveable patient bed is configured to be moved within the field of view of the imaging modality. The processor is configured to: calculate a high sensitivity continuous bed motion (HS-CBM) scan protocol comprising at least a first zone and a second zone, operate the moveable bed at a first movement rate within the field of view, operate the moveable bed at a second movement rate within the field of view, receive imaging data from the imaging modality corresponding to the first zone and the second zone, and generate a medical image using the imaging data. The HS-CBM scan maximizes scan sensitivity within an area of interest. The area of interest has a third longitudinal length greater than the first longitudinal length. The first movement rate corresponds to the first zone and the second movement rate corresponds to the second zone.

In the second embodiment, the HS-CBM scan protocol can be calculated based on a total scan time.

In the second embodiment, the HS-CBM scan protocol can be calculated numerically as an optimization function configured to optimize counts to be detected within the area of interest.

In the second embodiment, a total scan area of the HS-CBM scan protocol can substantially overlap with the area of interest.

In the second embodiment, at least one of the first movement rate or the second movement rate includes a variable time per bin.

In the second embodiment, at least one of the first movement rate or the second movement rate can be zero.

In the second embodiment, the HS-CBM scan protocol can be calculated based on a predefined CBM protocol having a continuous movement rate over a CBM scan area.

In the second embodiment, the CBM scan area can be greater than a total scan area of the HS-CBM scan protocol.

A third embodiment includes a computer-implemented method. The method includes the steps of calculating a high sensitivity continuous bed motion (HS-CBM) scan protocol comprising a plurality of zones. The HS-CBM scan maximizes scan sensitivity within an area of interest. The area of interest has a longitudinal distance less than a total scan area and the HS-CBM scan protocol is calculated based on a predefined CBM protocol having a continuous movement rate over a CBM scan area. The CBM scan area is greater than the total scan area and a total scan time of the HS-CBM scan protocol is equal to a total scan time of the predefined CBM protocol. The method further includes the steps of operating a moveable bed at a first movement rate within an imaging field of view of an imaging modality, operating the moveable bed at a second movement rate within the imaging field of view of the imaging modality, and generating a medical image using scan data obtained in the plurality of zones. The first movement rate corresponds to a first zone in the plurality of zones and the second movement rate corresponds to a second zone in the plurality of zones.

In the third embodiment, the HS-CBM scan protocol can be calculated numerically as an optimization function configured to optimize counts to be detected within the area of interest.

In the third embodiment, at least one of the first movement rate or the second movement rate can include a variable time per bin.

Although the subject matter has been described in terms of exemplary embodiments, it is not limited thereto. Rather, the appended claims should be construed broadly, to include other variants and embodiments, which may be made by those skilled in the art.

What is claimed is:

1. A computer-implemented method comprising:
calculating a high sensitivity continuous bed motion (HS-CBM) scan protocol comprising a total scan area including at least a first zone and a second zone, wherein the HS-CBM scan protocol maximizes scan sensitivity within the total scan area, wherein the HS-CBM scan protocol is calculated based on a predefined CBM protocol having a continuous movement rate, wherein a total scan time of the HS-CBM scan protocol is equal to a total scan time of the predefined CBM protocol, and wherein the HS-CBM scan protocol provides a constant sensitivity over the total scan area;
operating a moveable bed at a first movement rate within an imaging field of view of an imaging modality, wherein the first movement rate corresponds to the first zone;
operating the moveable bed at a second movement rate within the imaging field of view of the imaging modality, wherein the second movement rate corresponds to the second zone, and wherein the first movement rate and the second movement rate provide the constant sensitivity over the total scan area; and
generating a medical image using scan data obtained in the first zone and the second zone.

2. The computer-implemented method of claim 1, wherein the HS-CBM scan protocol is calculated based on the total scan time.

3. The computer-implemented method of claim 1, wherein the HS-CBM scan protocol is calculated numerically as an optimization function configured to optimize counts to be detected within the total scan area.

4. The computer-implemented method of claim 1, wherein at least one of the first movement rate or the second movement rate comprises a variable time per bin.

5. The computer-implemented method of claim 1, wherein at least one of the first zone or the second zone has a longitudinal length equal to or less than a longitudinal length of the imaging field of view of the imaging modality, and wherein a corresponding one of the first movement rate or the second movement rate in the at least one of the first zone or the second zone is zero.

6. The computer-implemented method of claim 1, wherein a CBM scan area is greater than the total scan area of the HS-CBM scan protocol.

7. A system, comprising:
an imaging modality defining a field of view having a first longitudinal length;
a moveable patient bed having a second longitudinal length greater than the first longitudinal length, wherein the moveable patient bed is configured to be moved within the field of view of the imaging modality; and
a processor, configured to:
calculate a high sensitivity continuous bed motion (HS-CBM) scan protocol comprising a total scan area including at least a first zone and a second zone, wherein the HS-CBM scan protocol maximizes scan sensitivity within the total scan area, wherein the total scan area of the HS-CBM scan protocol has a third longitudinal length greater than the first longitudinal length, wherein the HS-CBM scan protocol is calculated based on a predefined CBM protocol having a continuous movement rate, wherein a total scan time of the HS-CBM scan protocol is equal to a total scan time of the predefined CBM protocol, and wherein the HS-CBM scan protocol provides a constant sensitivity over the total scan area;
operate the moveable bed at a first movement rate within the field of view, wherein the first movement rate corresponds to the first zone;
operate the moveable bed at a second movement rate within the field of view, wherein the second movement rate corresponds to the second zone, and wherein the first movement rate and the second movement rate provide the constant sensitivity over the total scan area; and
receive imaging data from the imaging modality corresponding to the first zone and the second zone; and
generate a medical image using the imaging data.

8. The system of claim 7, wherein the HS-CBM scan protocol is calculated based on a total scan time.

9. The system of claim 7, wherein the HS-CBM scan protocol is calculated numerically as an optimization function configured to optimize counts to be detected within the total scan area.

10. The system of claim 7, wherein at least one of the first movement rate or the second movement rate comprises a variable time per bin.

11. The system of claim 7, wherein at least one of the first zone or the second zone has a fourth longitudinal length equal to or less than the first longitudinal length of the imaging field of view of the imaging modality, and wherein a movement rate in the at least one of the first zone or the second zone is zero.

12. The system of claim 7, wherein a CBM scan area is greater than the total scan area of the HS-CBM scan protocol.

13. A computer-implemented method, comprising:
calculating a high sensitivity continuous bed motion (HS-CBM) scan protocol comprising a plurality of zones, wherein the HS-CBM scan maximizes scan sensitivity within a total scan area comprising the plurality of zones, wherein the HS-CBM scan protocol is calculated based on a predefined CBM protocol having a continuous movement rate over a CBM scan area, wherein the CBM scan area is greater than the total scan area, and wherein a total scan time of the HS-CBM scan protocol is equal to a total scan time of the predefined CBM protocol, and wherein the HS-CBM scan protocol provides a constant sensitivity over the total scan area;

operating a moveable bed at a first movement rate within an imaging field of view of an imaging modality, wherein the first movement rate corresponds to a first zone in the plurality of zones;

operating the moveable bed at a second movement rate within the imaging field of view of the imaging modality, wherein the second movement rate corresponds to a second zone in the plurality of zones, and wherein the first movement rate and the second movement rate provide the constant sensitivity over the total scan area; and generating a medical image using scan data obtained in the plurality of zones.

14. The computer-implemented method of claim 13, wherein the HS-CBM scan protocol is calculated numerically as an optimization function configured to optimize counts to be detected within the total scan area.

15. The computer-implemented method of claim 13, wherein at least one of the first movement rate or the second movement rate comprises a variable time per bin.

16. The computer-implemented method of claim 13, wherein at least one of the first zone or the second zone has a longitudinal length equal to or less than a longitudinal length of the imaging field of view of the imaging modality, and wherein a movement in the at least one of the first zone or the second zone is zero.

* * * * *